(12) United States Patent
Yeh

(10) Patent No.: US 6,629,644 B2
(45) Date of Patent: Oct. 7, 2003

(54) MEMORY CARD CONNECTOR FOR PREVENTING MEMORY CARD FROM SHORT CIRCUIT

(76) Inventor: Kevin Yeh, 235 Chung - Ho Box 8-24, Taipei (TW)

(*) Notice: Subject to any disclaimer, the term of this patent is extended or adjusted under 35 U.S.C. 154(b) by 0 days.

(21) Appl. No.: 10/046,041

(22) Filed: Jan. 15, 2002

(65) Prior Publication Data

US 2003/0024983 A1 Feb. 6, 2003

(30) Foreign Application Priority Data

Aug. 3, 2001 (TW) ...................................... 90213165 U

(51) Int. Cl.⁷ .............................................. G06K 19/06
(52) U.S. Cl. ...................... 235/492; 235/379; 235/487; 235/380
(58) Field of Search ................................ 235/492, 379, 235/487, 380

(56) References Cited

U.S. PATENT DOCUMENTS 5,902,992 A * 5/1999 Igarashi ...................... 235/492
6,234,845 B1 * 5/2001 Hakozaki ..................... 439/633
6,508,402 B1 * 1/2003 Takada et al. ............... 235/451

\* cited by examiner

*Primary Examiner*—Karl D. Frech
*Assistant Examiner*—Allyson Sanders

(57) ABSTRACT

A memory card connector for preventing a memory card from short circuit and increasing the reliability is disclosed. In the present invention, a memory casing enclosing the connector, a detector and a fastening unit appended to the metal casing are used to achieve above object. In the detector, a metal elastic piece appended to the metal casing serves to convert the force of inserting a memory card to a transversal force. Then, by this force, it contacts the detecting terminal connected to the circuit of a circuit board. Further, the connector is grounded through the metal elastic piece and the metal casing so as to actuate the circuit of the memory card. Furthermore, by a fastening material to increase the reliability of the memory card, a memory card connector for preventing a memory card from short circuit is formed.

12 Claims, 6 Drawing Sheets

MEMORY CARD CONNECTOR FOR PREVENTING MEMORY CARD FROM SHORT CIRCUIT

FIELD OF THE INVENTION

The present invention relates to a connector, and particularly to a memory card connector for preventing a memory card from short circuit.

BACKGROUND OF THE INVENTION

With the advance of electronic technology, memory cards are widely used in many electronic devices, such as notebook computers, digital cameras, digital video recorders, personal digital assistants (PDAs), mobile phones, etc.

Memory cards are a card for recording digital data and have IC chips. The memory cards can be classified into contact type memory cards and non-contact type memory cards. Most of the memory cards are contact type memory cards. The non-contact type memory cards are widely used in for example security systems of low costs.

Many memory cards have different specifications, for example subscriber identity module cards (SIM card) used in various mobile phones; compact flash cards (CF cards) used in digital cameras or digital video recorders; or IC financial cards. These are examples of contact type IC cards. In that, CF cards and SIM cards are widely used.

The memory cards are connected to electronic products by memory card connectors. The conventional connectors has no design for preventing the memory cards from short circuits. After the memory card is inserted into a connector, it is possible to short-circuit with other electronic elements. Moreover, no any device is designed to assure that the memory card has been correctly inserted a connector.

To resolve above problem, an improved memory card connector is invented, as shown in the FIGS. 1 to 3. In this design, an iron case 20 is installed at an outer side of an original connector 10. This iron case 20 is grounded with the circuit of a circuit board for preventing the memory card from short circuit because the memory card is in contact with other adjacent electronic elements. Moreover, a detector is designed for determining whether the memory card is correctly inserted into the connector and the circuit of the circuit board is conducted. This detector includes a detecting terminal 21 connected to the circuit of a circuit board and an elastic piece 22 connected to the iron case 20. When the memory card is inserted into the connector 10, this elastic piece will not contact the detecting terminal 21, and thus the circuit of the connector 10 can not grounded. Thereby, the circuit can not work. This elastic piece 22 is disposed at a distal end that the memory card is correctly inserted into the connector. It can be pushed by the force that the memory card inserts into the connector 10 (referring to FIG. 3). That is, the elastic piece moves reciprocally along the direction that the memory card is inserted into the connector 10. Once the memory card is not inserted into the innermost of the connector 10, the elastic piece 22 will not be in contact with the detecting terminal 21, and thus, the circuit of the connector 10 will not be actuated.

In fact, from the experiences, the memory card is possibly released during the transferring process of the electronic products. Under the condition that the elastic piece 22 is in contact with the detecting terminal 21, a small pushing force is formed along a direction of pushing the memory card. However, this will cause the looseness of the memory card. Therefore, this prior connector easily induce the looseness of the memory card and thus it can not work.

SUMMARY OF THE INVENTION

Accordingly, the primary object of the present invention is to provide a memory card connector for preventing a memory card from short circuit and increasing the reliability.

To achieve the object, the present invention provides a memory card connector for preventing a memory card from short circuit and increasing the reliability. In the present invention, a memory casing enclosing the connector, and a detector and a fastening unit appended to the metal casing are used to achieve above object. In the detector, a metal elastic piece appended to the metal casing serves to convert the force of inserting a memory card to a transversal force. Then, by this force, it contacts the detecting terminal connected to the circuit of a circuit board. Further, the connector is grounded through the metal elastic piece and the metal casing so as to actuate the circuit of the memory card. Furthermore, a fastening material is used to increase the reliability of the memory card. Thus, a memory card connector for preventing a memory card from short circuit is formed.

Furthermore, the fastening unit is formed by two clamping arms at two opposite sides of the memory card. The clamping arms is formed by bending metal material of the memory casing at two opposite sides of the memory card. By the elastic force from the metal material, the memory card inserted into the connector body is clamped.

The various objects and advantages of the present invention will be more readily understood from the following detailed description when read in conjunction with the appended drawing.

DETAILED DESCRIPTION OF THE PREFERRED EMBODIMENTS

Figure 1:
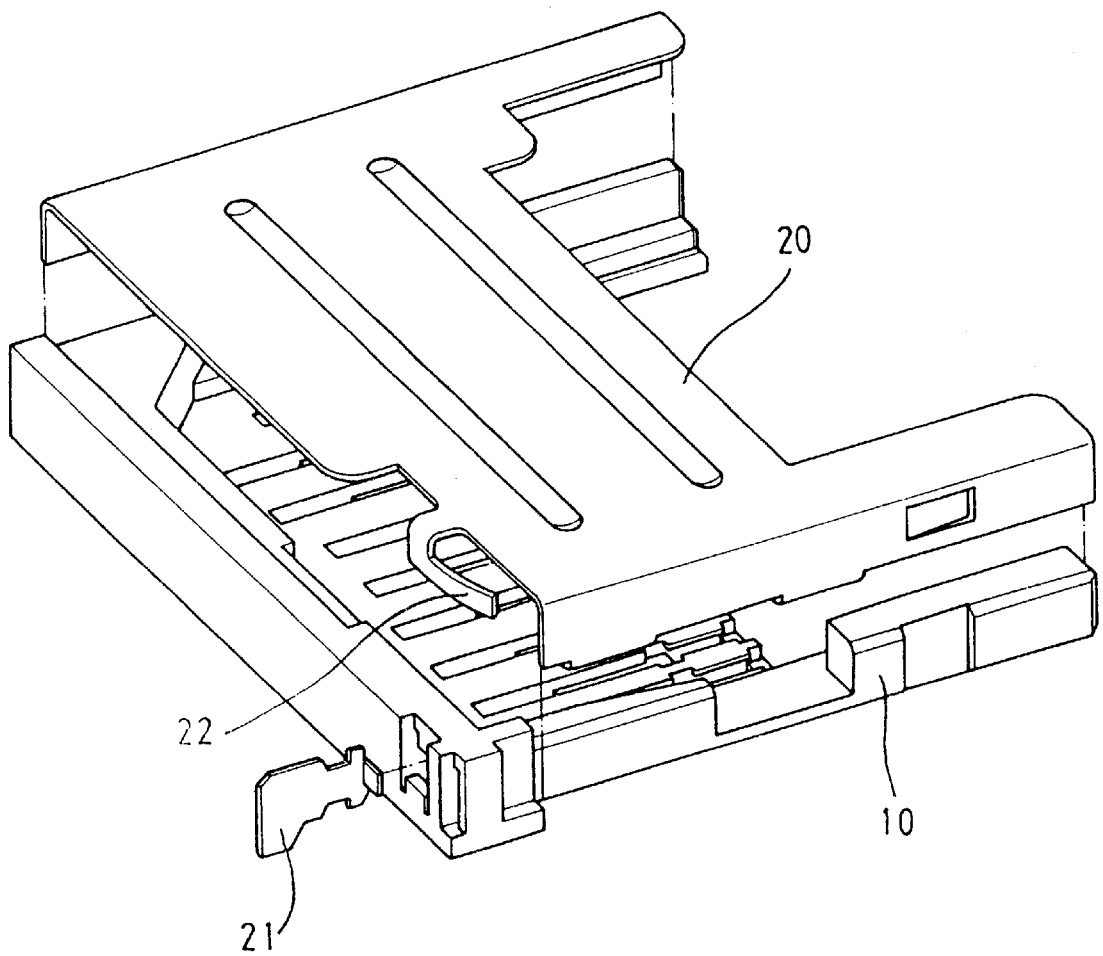
FIG. 1 is an exploded perspective view of a conventional memory card connector.
Figure 2:
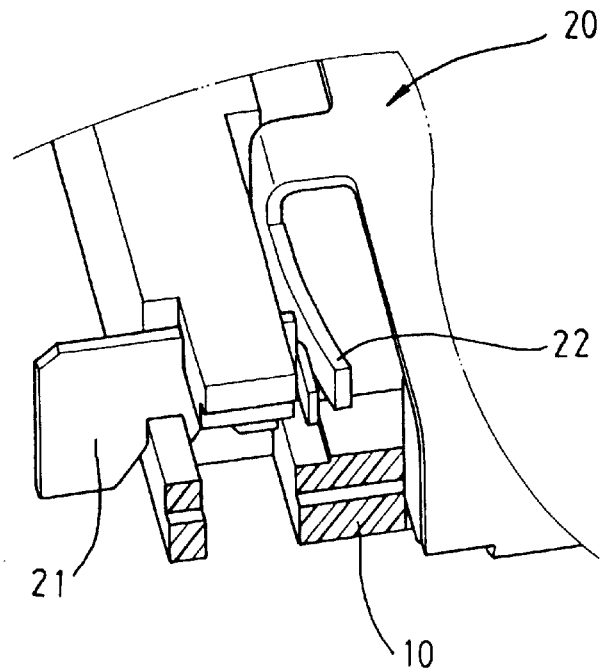
FIG. 2 is a partial structural view of the conventional memory card connector.
Figure 3:
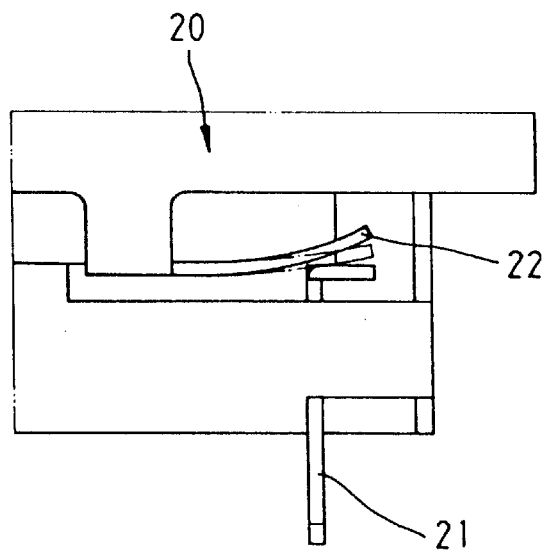
FIG. 3 shows the relations of the elastic piece and detecting terminal of the conventional memory card connector.
Figure 4:
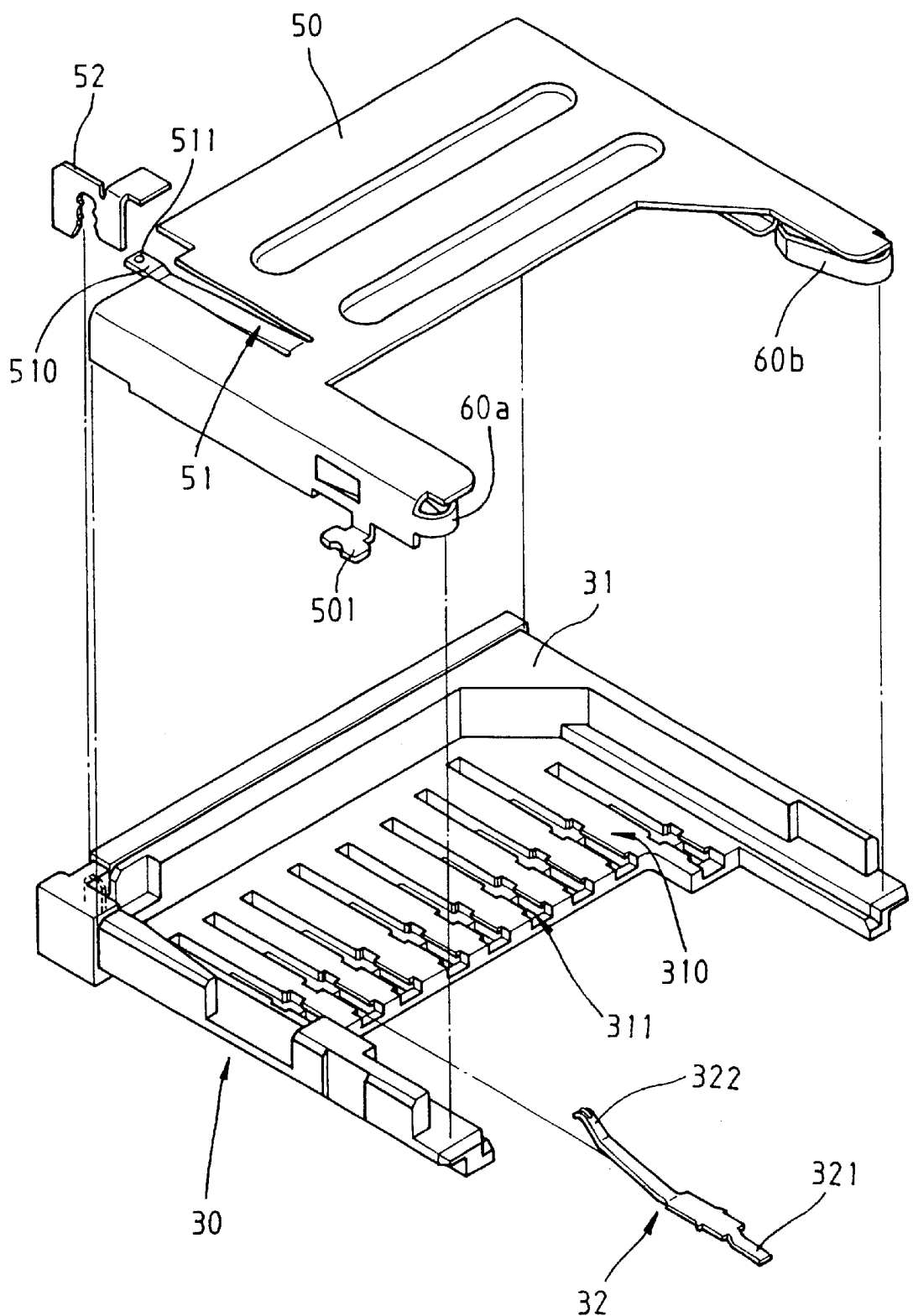
FIG. 4 is an exploded perspective view of the present invention.

Referring to FIG. 4, the connector used in a memory card is illustrated. The connector has the following components.

Figure 5:
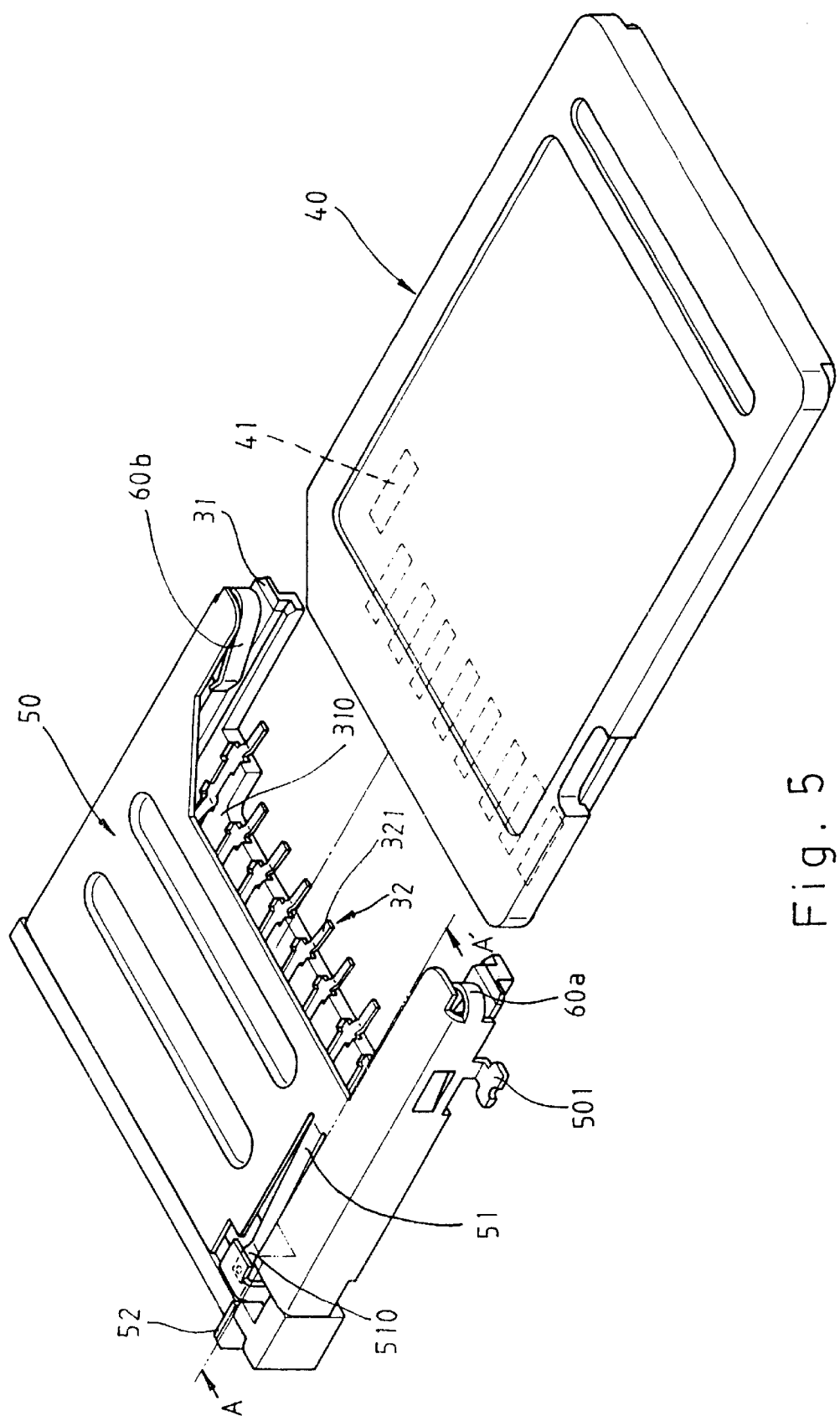
FIG. 5 is a schematic view of the application of the present invention showing the relation of the memory card connector and the memory card.
Figure 6A:
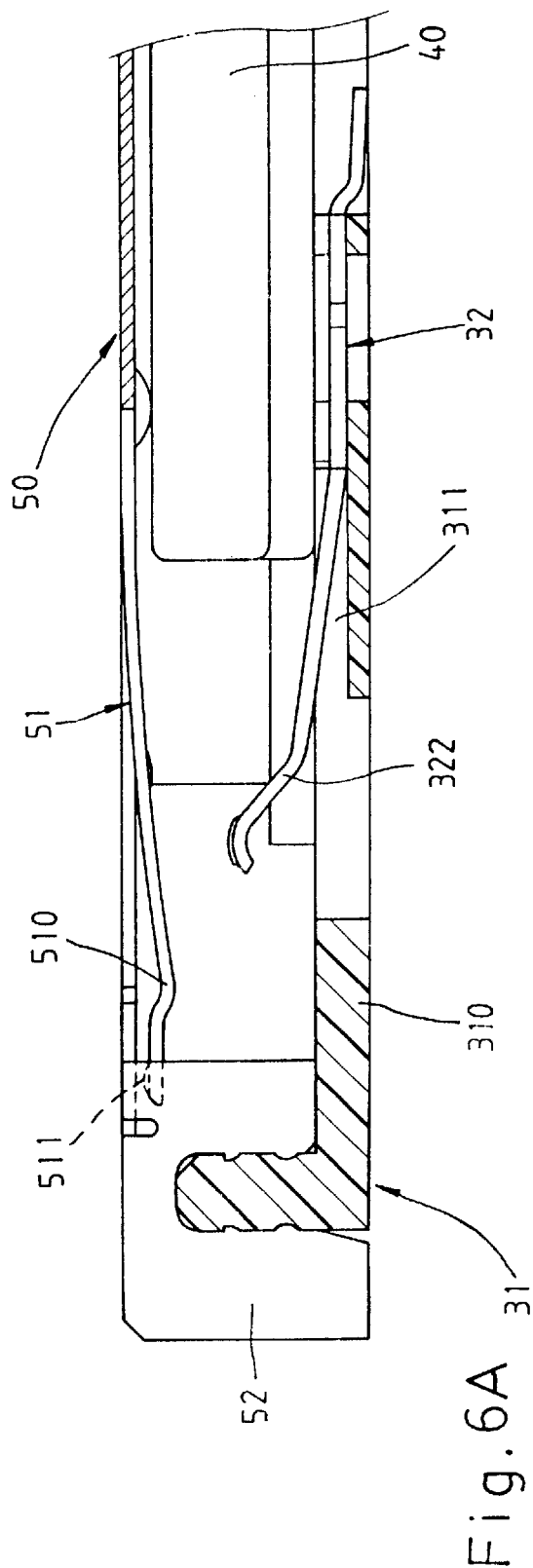
FIGS. 6A~6B are cross section views along A–A' of FIG. 5, showing the conditions that the memory card has inserted and has not inserted into the connector body, respectively.
Figure 6B:
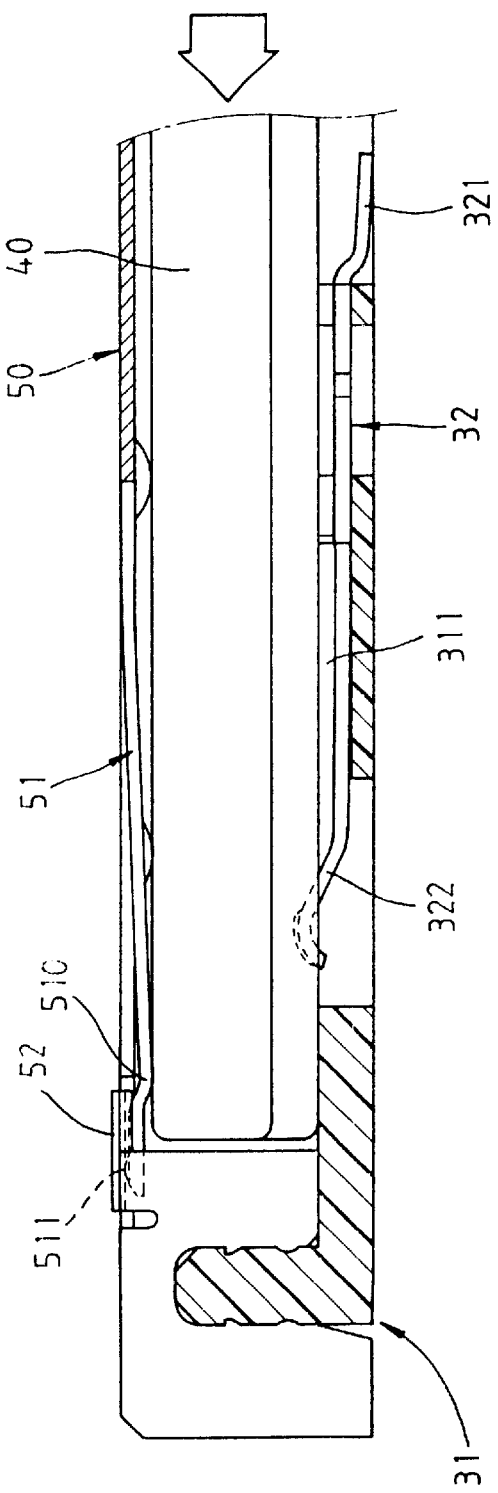

A connector body 30 is formed by an insulating frame 31 and a plurality of elastic metal electrodes 32 installed at a bottom plate 310 of the frame 31. The metal electrodes 32 are inserted into a plurality of slots 311 of the bottom plate 310 of the frame 31. Each metal electrode 32 is bent at an end. A front end 321 of the metal electrode 32 bends downwards for being welded to a circuit (not shown) on a circuit board below the connector body 30. A distal end 322 of the metal electrode 30 is curled upwards and is higher than the slots 311 of the bottom plate 310 for contacting the gold fingers 41 of the memory card 40 (referring to FIG. 5B and FIG. 6B).

A detector includes a metal casing 50, a metal elastic piece 51 and a detecting terminal 52. The metal casing 50 encloses the connector body 30. A welding piece 501 extending from the edge of the metal casing 50 is welded to the circuit of a circuit board, which has the function of fixing the metal casing. One end of the metal elastic piece 51 is connected to the metal casing 50. The free end 510 of the metal elastic piece 51 is bent and has at least one portion extending to a moving path as the memory card 40 is inserted into the connector body 30. The detecting terminal 52 is inserted into one corner of the frame 31of the connector body 30 and is connected to the circuit of the circuit board. Generally, the metal elastic piece 51 does not contact the detecting terminal 52, but when the memory card 40 is inserted into the connector body 30 correctly, the metal elastic piece 51 may be pushed toward a direction transversal to the moving path of the memory card 40 (referring to FIGS. 6A, 6B). The detecting terminal 52 is installed at a position to be in contact with the free end 510 of the metal elastic piece 51 after the metal elastic piece 51 is pushed. Then, the detecting terminal 52 may conduct the circuit of the circuit board through the metal elastic piece 51 and the metal casing. Thereby, the memory card 40 inserted can be used.

Figure 7A:
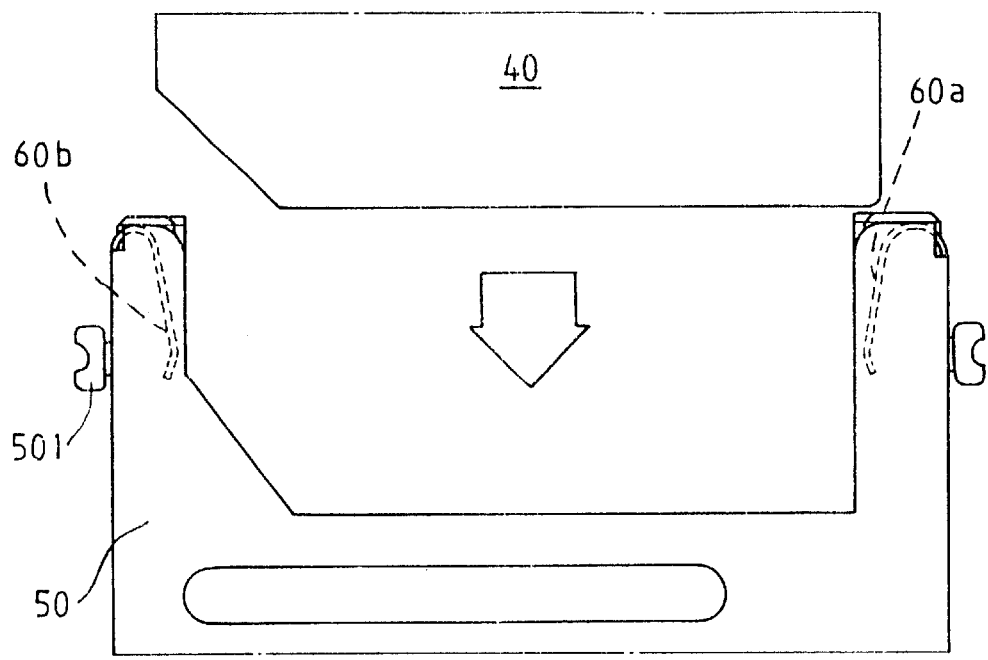
FIGS. 7A~7B are schematic view of the application of the present invention, showing the conditions that the memory card has been inserted and has not been inserted into the connector body, respectively.
Figure 7B:
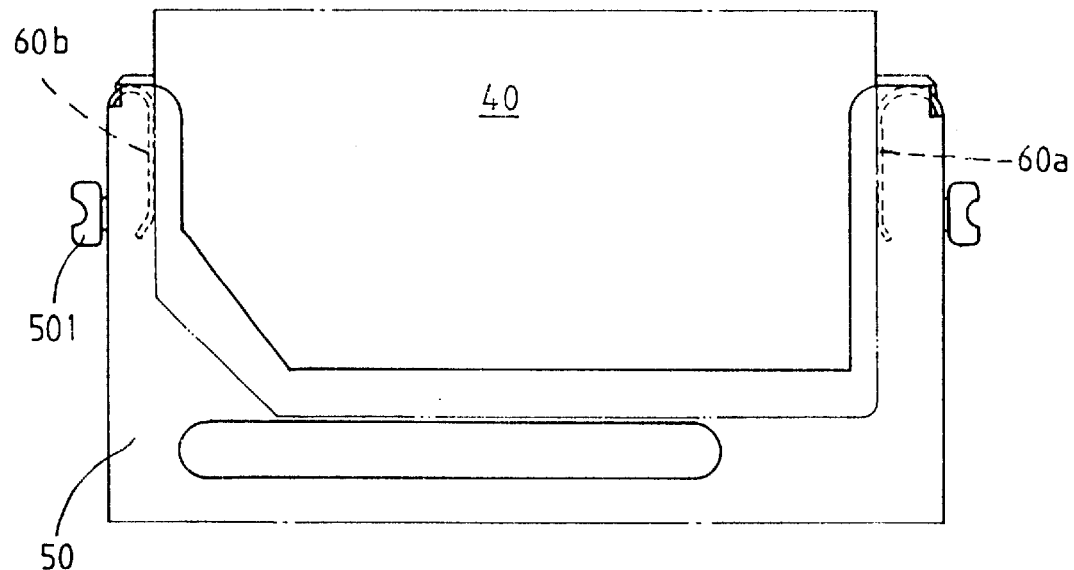

A fastening unit is formed by two clamping arms 60a and 60b at two opposite sides of the memory card 40. The clamping arms 60a, 60b are formed by bending the metal material of the memory casing 50 at two opposite sides of the memory card 40. By the elastic force after the metal material is bent, the memory card 40 can be clamped to prevent the memory card 40 from looseness due to outer force (referring to FIGS. 7A, 7B).

A preferred bending direction of the pair of clamping arms 60a, 60b is bent toward a direction which is a direction that the memory card 40 inserts into the connector body 30 so as to increase the resistance force that the memory card 40 moves along an opposite direction. If necessary, the surface of the two clamping arms 60a, 60b which serves to contact the memory card 40 may be made to have a large friction force or added with a friction sheet. For example, the surface of the clamping arms 60a, 60b are made as a wavelike surface, a teeth surface, a coarse surface, or added with a layer of friction surface (such as rubber, plastics, etc.) for enhancing the friction force so as to prevent the memory card 40 from looseness due to outer applied forces.

Since the metal elastic piece 51 is installed at an opposite side with respect to the side of the gold fingers 41 of the memory card 40. When the memory card 40 is correctly inserted into the connector body 30 and achieves to a predetermined position, the elastic-like metal electrode 30 on the surface of the bottom plate 310 is in contact with the gold fingers 41 of the memory card 40. Meanwhile, a force is induced, which will push the memory card 40 to resist against the metal elastic piece 51. Since this will provide an assisting force for the contact of the metal elastic piece 51 and the detecting terminal 52, the reliability for connecting the memory card 40 to the connector body 30 is increased.

In another preferred embodiment, at the position that the surface at the free end 510 of the metal elastic piece 51 is in contact with the detecting terminal 52, a ball-like or protruded contact point 511 can be arranged for enhancing the reliability of the metal elastic piece 51 and the detecting terminal 52.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A memory card connector for preventing a memory card from short circuit comprising:

a connector body having an insulating frame and a plurality of elastic metal electrodes installed at a bottom plate of the frame; one end of each metal electrode being electrically connected to a circuit of a circuit board, and another end of each metal electrode being curled upwards and being elastic for contacting with gold fingers of a memory card; and a detector including a metal casing, a metal elastic piece, a detecting terminal; the metal casing enclosing the connector body and being electrically connected to the circuit of the circuit board; one end of the metal elastic piece being connected to the metal casing;

wherein in general condition, the metal elastic piece does not contact the detecting terminal, but when the memory card is inserted into the connector body correctly, the metal elastic piece is pushed toward a direction transversal to a moving path of the memory card so as to be in contact with a free end of the metal elastic piece after the metal elastic piece is pushed; then, the detecting terminal conducts the circuit of the circuit board through the metal elastic piece and the metal casing; thereby, the memory card inserted is usable.

2. The memory card connector for preventing a memory card from short circuit as claim in claim 1, wherein an edge of the memory casing is extended with a welding portion for being welded to a circuit of a circuit board and for retaining the memory casing.

3. The memory card connector for preventing a memory card from short circuit as claim in claim 1, wherein a free end of the metal elastic piece is bent and has at least one portion extending to a moving path that the memory card is inserted into the connector body.

4. The memory card connector for preventing a memory card from short circuit as claim in claim 3, wherein a contact portion is formed at a surface of the metal elastic piece which is in contact with the detecting terminal.

5. The memory card connector for preventing a memory card from short circuit as claim in claim 1, further comprising a fastening unit formed by two clamping arms at two opposite sides of the memory card; the clamping arms are formed by bending metal material of the memory casing at two opposite sides of the memory card; by the elastic force after the metal material is bent, the memory card inserted into the connector body is clamped.

6. The memory card connector for preventing a memory card from short circuit as claim in claim 5, wherein the clamping arms are bent toward a direction along which that the memory card inserts into the connector body.

7. The memory card connector for preventing a memory card from short circuit as claim in claim 5, wherein a friction contact surface is formed at surfaces of the clamping arms contacting the memory card.

8. The memory card connector for preventing a memory card from short circuit as claim in claim 7, wherein the friction contact surface is a wave-like surface.

9. The memory card connector for preventing a memory card from short circuit as claim in claim 7, wherein the friction contact surface is a teeth-like surface.

10. The memory card connector for preventing a memory card from short circuit as claim in claim 7, wherein the friction contact surface is a coarse surface.

11. The memory card connector for preventing a memory card from short circuit as claim in claim 7, wherein the friction contact surface is formed by adhering a layer of material which is capable of generating a large friction force.

12. The memory card connector for preventing a memory card from short circuit as claim in claim 11, wherein the material is rubber.

* * * * *